United States Patent

De Villeneuve

[11] 4,309,645
[45] Jan. 5, 1982

[54] DC MOTOR SPEED CONTROLLER

[76] Inventor: Dail A. De Villeneuve, 8832 Shirley Ave., Suite 4, Northridge, Calif. 91324

[21] Appl. No.: 36,791

[22] Filed: May 7, 1979

Related U.S. Application Data

[62] Division of Ser. No. 703,171, Jul. 7, 1976, Pat. No. 4,153,853.

[51] Int. Cl.³ ............................................. H02P 5/16
[52] U.S. Cl. ................................... 318/341; 318/139; 363/124
[58] Field of Search ............... 318/16, 581, 341, 139; 363/124; 323/282, 311

[56] References Cited

U.S. PATENT DOCUMENTS

| | | | |
|---|---|---|---|
| 3,064,175 | 11/1962 | Vergez, Jr. | 318/341 |
| 3,354,371 | 11/1967 | Ainsworth et al. | 318/341 |
| 3,358,206 | 12/1967 | Thiele | 318/341 |
| 3,381,145 | 4/1968 | Sterff | 307/254 |
| 3,525,029 | 8/1970 | Joslyn et al. | 318/341 |
| 3,560,829 | 2/1971 | Brennan | 318/681 |
| 3,617,845 | 11/1971 | McKenna | 318/341 |
| 3,803,471 | 4/1974 | Price et al. | 318/341 |
| 3,989,992 | 11/1976 | Schmidt | 318/341 |
| 4,143,307 | 3/1979 | Hansen | 318/16 |
| 4,218,730 | 8/1980 | Marumoto et al. | 363/124 |

Primary Examiner—David Smith, Jr.

Attorney, Agent, or Firm—Spensley, Horn, Jubas & Lubitz

[57] ABSTRACT

An electronic speed controller for a radio controlled model has conversion circuitry to derive a dc signal having a level that is proportional to the information pulse width of the radio control signal, but which is insensitive to changes in the frame rate thereof. This dc signal level is compared with a reference triangular wave to obtain a digital control signal having a duty cycle proportional to the information pulse width. This signal is used to gate battery voltage to the motor, thereby to control its speed.

In one embodiment, the battery voltage is supplied to the motor via a power transistor. A switching regulator connected between the motor battery and the base of the power transistor provides sufficient base current to drive that transistor into saturation regardless of the motor battery voltage, and with the base current responsive to the Vbe of that transistor. The regulator is gated on by the digital control signal. In another embodiment, battery voltage is supplied to the motor via a power transistor bridge. One or the other pair of bridge transistors is turned on by the digital control signal, which in this embodiment is a three-level signal having a polarity dependent on whether the information pulse width is above or below a certain mid-range value. The gating circuitry provides constant base drive current to the pair of bridge transistors that is turned on.

13 Claims, 4 Drawing Figures

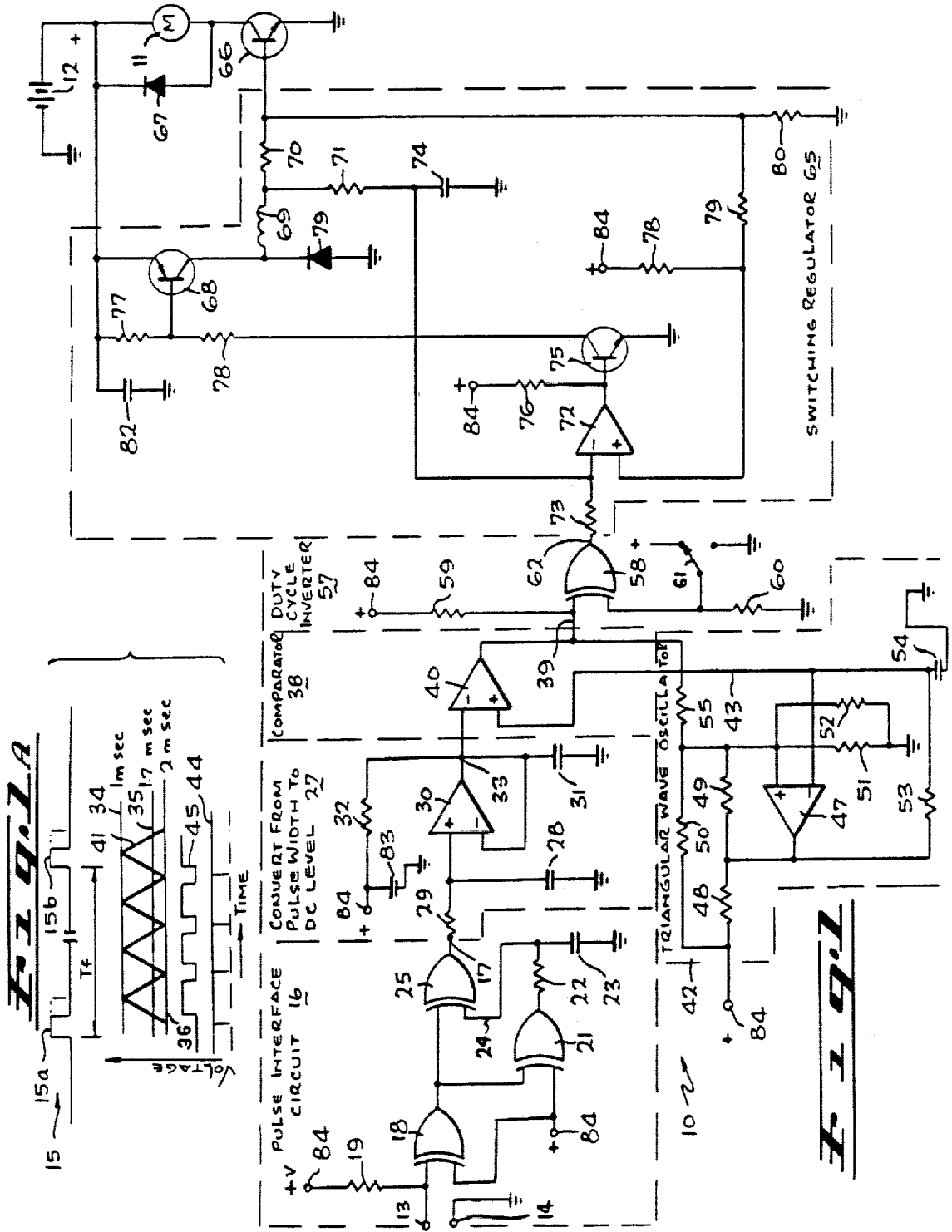

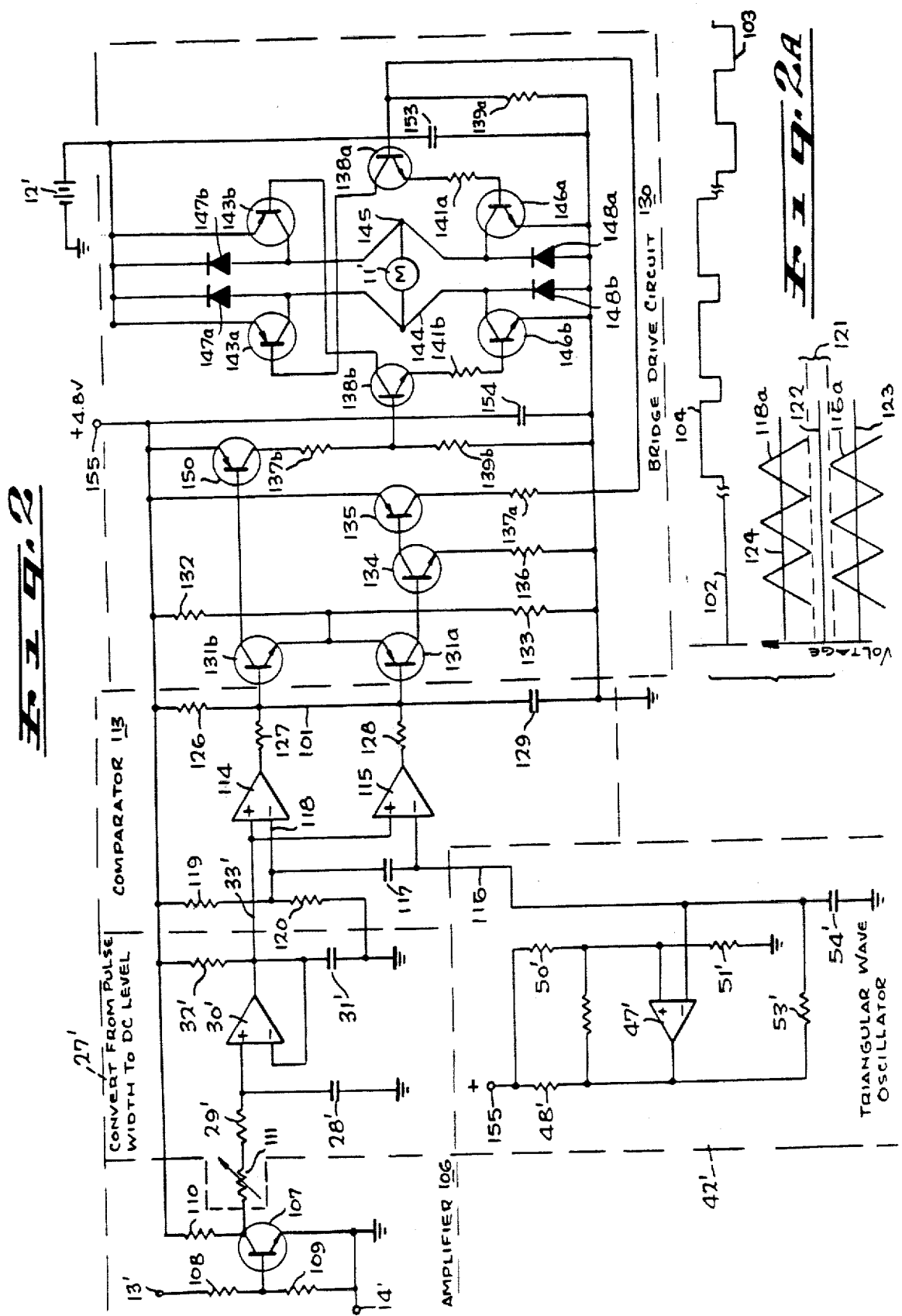

DC MOTOR SPEED CONTROLLER

This application is a division of U.S. patent application Ser. No. 703,171, filed July 7, 1976 now U.S. Pat. No. 4,153,853.

BACKGROUND OF THE INVENTION

1. Field of the Invention

The present invention relates to electronic speed control circuitry for dc motors, and particularly to such circuitry useful in conjunction with radio controlled models.

2. Description of the Prior Art

The use of electric motors in radio controlled model aircraft, boats and autos has gained widespread acceptance amongst modelers. Such motors are almost silent, as compared to glow-plug type combustion engines, are cleaner and easier to start, run and maintain, and require no cumbersome liquid fuel supply. They permit implementation of electronic speed control in flight or during travel of a model boat or auto.

Most radio control systems for models employ a pulse width modulation system. The radio control receiver includes a digital decoder which produces an output pulse train in which successive pulses occur at a 16 msec frame rate. The duration of each pulse typically is in the range of from 1 msec to 2 msec, depending on the position of the control throttle at the radio control transmitter. With some transmitters, the pulse width increases when the throttle lever is advanced. Thus, a pulse of minimum width (1 msec) indicates a closed throttle, and a maximum pulse width (2 msec) indicates full throttle or maximum speed. In other transmitters, the pulse width decreases (e.g., from 2 msec to 1 msec) as the throttle lever is advanced.

A principle object of the present invention is to provide circuitry for controlling the speed of a dc motor in a radio controlled vehicle in response to the pulse width modulated signal obtained from the radio control receiver. Another objective is to provide such a controller that is operative selectively with systems in which the pulse width either increases or decreases to achieve an increase in motor speed.

A further object of the present invention is to provide an electronic speed controller that is operative with one or more dc motors having a wide range of power. This is important, since typical motors used with model vehicles have a wide range of operating voltages and currents. Thus, the motors may range from a low of 3 volts at 1 ampere (3 watts) to a high of 36 volts at 25 amperes (900 watts). For any motor size, it is important to minimize the power drain of the control circuitry, so that battery lifetime between recharging, and hence the flight time of the model, is maximized. Another object of the present invention is to provide a speed controller in which battery drain is minimized.

By contrast, prior art speed control techniques used power very inefficiently, and thus drained down the limited battery power at excessively fast rates. One such inefficient system employed a conventional digital pulse mechanical servo to move the arm of a rheostat placed in series with the motor. When the motor voltage is reduced to one-half, the rheostat burns up in heat an equal amount of energy. Thus, if the motor is run at low speeds, one-half or more of the battery power is totally wasted. Flight time is reduced concomitantly. Furthermore, a series resistance type controller exhibits poor speed regulation of the motor as the power is diminished when torsional load is applied, because the increasing current requirements cause a further voltage drop to the motor.

Another prior art speed control method employed a digital pulse responsive mechanical servo coupled to a potentiometer. Like the servo-controlled rheostat, this technique has the inherent unreliability of requiring mechanical connection to the variable resistance. The potentiometer typically was used to drive a dc transistor amplifier, usually an emitter follower. Better speed regulation was achieved because a fixed voltage is generated for a certain pulse width output from the radio control receiver. However, the problem of dissipated heat loss still exists, and is compounded since there is a power loss even when the motor is full on.

This full-on power loss has two components. The first concerns the power loss across the transistor which is connected in series between the battery and the motor. This slight loss is called the Vce saturation voltage drop between the collector and the emitter of the transistor. The other power loss, which is far more significant, is related to the gain of the output transistor. With practical power transistors, a current gain of 10 to 20 is nominal. Thus, if a 20 ampere motor is controlled by the transistor, an input current of e.g., 1 ampere is required just to turn the transistor fully on.

To achieve minimum Vce saturation voltage drop, a common emitter configuration is preferred. In such a circuit, the base to emitter current does not flow through the motor. Thus, the input power required to control the transistor represents a power loss, since it does not add to the current flowing through the motor. The amount of the this power loss is determined by the Vbe drop between the base and emitter of the output power transistor. Typically, this Vbe drop is 1 volt.

If a base current of 1 ampere is required to turn the motor-control transistor fully on, and this transistor has a Vbe drop of 1 volt, 1 watt is dissipated in the transistor. However, in the prior art potentiometer control system, the desired base current was achieved by using a resistor to drop the battery supply voltage to 1 volt at the desired base current. If a 36 volt motor is employed, then the drop across the resistor is equal to the 36 volts from the battery minus the 1 volt Vbe drop, at the required base current of 1 ampere. That is, 35 watts of power are dissipated by the resistor, even when the power transistor is fully saturated and the motor is running at full speed.

In the example just given, the base drive required by the transistor is 1 watt, equal to the Vbe drop of 1 volt times the base drive current of 1 ampere. However, using the dropping resistor technique to supply this power, 35 watts of power were dissipated. This is roughly a base drive efficiency of 3%. Obviously, this prior art technique of controlling motor speed in response to the decoder pulse output from a radio control receiver is highly inefficient. A further object of the present invention is to provide a totally electronic circuit for controlling the dc motor speed in which high efficiency is achieved in providing the base drive to the output power transistor, with a corresponding substantial reduction in battery power loss. Yet another object of the present invention is to provide such a controller which is totally electronic in operation and which does not employ a mechanical servo.

Some electronic controls have been developed in the past which vary the duty cycle of the battery potential applied to the dc motor in response to a variation in the control pulse width. In these systems, however, the time between pulses applied to the motor is equal to the frame rate, which as noted above, is approximately 16 msec (the time between consecutive information pulses each of which has a pulse width in the range of from 1 msec to 2 msec). These prior art pulse stretching control systems are frame rate sensitive. That is, if the frame rate should vary, different motor speeds would result even though the control pulse width remains at a constant value. Such frame rate sensitivity is undesirable for several reasons. For example, individual radio control transmitters, or those from different manufacturers, may have a frame rate that varies according to the control positions. This may result in an interaction between different control channel functions. For example, a change in rudder position may effect the frame rate and thus change the motor speed.

Another problem associated with pulse width modulation systems operating at the frame rate is that the motor tends to run rough at low speeds. Further, the motor brushes wear out faster, because application of current to the motor in bursts at the frame rate is analogous to starting a motor repetitively under load conditions. This results in high transient currents that may be in excess of the continuous current capability of the brushes. Yet another object of the present invention is to provide an electronic speed controller which does not switch current to the motor at the frame rate, and which is frame rate insensitive.

Still a further object of the present invention is to provide a circuit for controlling both the speed and the direction of rotation of a dc motor in response to a pulse width modulated signal from a radio control receiver. The circuit is particularly useful to control the electric drive motor of a model boat or car. It facilitates the remote selection of forward or reverse direction, in addition to controlling the vehicle's speed.

SUMMARY OF THE INVENTION

These and other objectives are achieved by the inventive dc motor speed control circuits wherein the motor drive transistors are controlled digitally by a pulse train having a duty cycle that is directly related to the pulse width of the radio control receiver output, but is independent of the frame rate thereof. Advantageously, the duty cycle of this pulse train ranges between zero and 100% for a corresponding full excursion of the input radio control signal pulse width. Appropriate base drive circuitry provides the requisite base current to the motor switching transistor, with minimum power loss, independent of the motor battery voltage.

In a first embodiment, a pulse interface circuit converts the signal from the radio control receiver to a corresponding pulse train in which the pulses are always of one polarity, regardless of the pulse polarity from the digital decoder in the receiver. This standardized signal next is converted to a dc level that is proportional to the pulse width of the received radio control signal. Long term integration is used to ensure that this dc level is frame rate insensitive. The dc level establishes the duty cycle of a pulse train used to switch the output power transistor. The conversion from dc level to duty cycle is achieved in a comparator that produces an output during the period of time that the dc level is greater than the voltage of a reference triangular wave signal.

Base drive to the motor switching transistor is provided by a switching regulator that is gated on during the on duty cycle of the signal from the comparator. The switching regulator itself includes a feedback network, responsive to the base drive voltage and current, that maintains these values at the requisite level to achieve fully saturated digital switching of the drive transistor while minimizing power loss in the base drive circuit.

In an alternative embodiment, forward/reverse control of the motor is achieved in addition to speed control. Again, the pulse width of the received radio control signal is converted to a dc level that is compared with a reference triangular wave. A pair of comparators are used to obtain a three-level signal which has a relative polarity indicative of motor direction and a duty cycle indicative of motor speed.

This three-level signal is used to control a bridge circuit that supplies power to the motor. If the signal is of one polarity indicative of forward motor rotation, a first pair of transistors, forming half of the bridge, are turned on for a duty cycle equal to that of the control signal. A constant current source is used to provide base current adequate to drive these transistors into saturation, with minimal power loss. If the control signal is of the opposite polarity, indicative of reverse motor rotation, another pair of transistors in the bridge is turned on. Similar constant current base drive circuitry forces these transistors into full saturation for a duration of time equal to the on duty cycle of the control signal.

BRIEF DESCRIPTION OF THE DRAWINGS

A detailed description of the invention will be made with reference to the accompanying drawings wherein like numerals designate corresponding parts in the several figures.

FIG. 1 is an electrical schematic diagram of a dc motor speed control circuit in accordance with the present invention.

FIG. 1A shows typical waveshapes associated with the operation of the circuit of FIG. 1.

FIG. 2 is an electrical schematic diagram of a second embodiment of the present invention in which both direction and speed of a dc motor are controlled.

FIG. 2A shows waveshapes associated with the operation of the circuit of FIG. 2.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention is best defined by the appended claims.

Operational characteristics attributed to forms of the invention first described also shall be attributed to forms later described, unless such characterisitcs obviously are inapplicable or unless specific exception is made.

Referring to FIG. 1, the inventive circuit 10 is used electronically to control the speed of a motor 11, powered by a battery 12, in response to a pulse width modulated control signal such as that obtained from the decoder output of a conventional radio control receiver. This signal, which is applied to the input terminals 13, 14, has the typical format illustrated by the waveshape 15 of FIG. 1A. It comprises a sequence of pulse 15a, 15b . . . having a time separation $T_f$ of approximately 16 msec (the "frame rate"). The width of each pulse 15a, 15b can vary, typically between 1 msec (solid line) and 2 msec (broken line), in accordance with the setting of the throttle lever at the associated radio control transmitter (not shown).

In the illustrated control signal 15 (FIG. 1A), the pulses 15a, 15b are of positive polarity. However, certain radio control receivers provide an output signal which normally is at a positive level, and in which the information pulses are negative-going. To permit operation with either input signal format, the speed controller 10 includes a pulse interface circuit 16 which automatically converts the input signal to a negative-going pulse format at a terminal 17.

This formating is accomplished by inverting the input signal through an exclusive-OR gate 18, one input of which is connected to a positive potential via a pull-up resistor 19. The average dc value of the input pulse train is determined by a circuit comprising an exclusive-OR gate 21 and an integrator consisting of a resistor 22 and a capacitor 23. This average dc level, present on a line 24, will differ depending on whether the input signal has positive going pulses like the waveform 15 in FIG. 1A, or is normally at a positive potential with negative-going information pulses. In the latter case, the dc level on the line 24 will be of a lower value than if the incoming signal has the waveshape 15.

The inverted input signal from the gate 18 is supplied as one input to another exclusive-OR gate 25 which receives as a second input the dc level on the line 24. The resultant output, at the terminal 17, is a normally positive signal having negative-going information pulses identical in frame rate and pulse width to the signal supplied to the input terminals 13 and 14. The pulse width of this signal at the terminal 17 is converted to a dc level by a circuit 27 (FIG. 1).

To this end, the information pulses at the terminal 17 are integrated by a capacitor 28 and a resistor 29. This develops, at the non-inverting (+) input of an operational amplifier 30, a negative peak voltage which is proportional to the pulse width of the incoming signal. The amplifier 30 functions as a peak detector. An integrator, consisting of a capacitor 31 and a resistor 32, stores this dc level over a number of frame periods. That is, the RC time constant of the capacitor 31 and the resistor 32 is chosen to be much longer than the frame period $T_f$. As a result, the dc level at the amplifier output terminal 33 is frame rate insensitive, and is proportional only to the pulse width of the input radio control signal. For example, if this pulse width is 1 msec, a first dc voltage level 34 (FIG. 1A) will be present. As the input pulse width increases, the voltage at the terminal 33 will be more negative, as typified by the dc levels 35 and 36 (FIG. 1A) resulting from input pulse widths of 1.7 msec and 2 msec respectively.

A comparator circuit 38 is used to provide on a line 39 a digital control signal having a duty cycle that is proportional to the dc level at the terminal 33. To this end, the comparator 38 comprises an operational amplifier 40 having an inverting (−) input that receives the dc level from the terminal 33. A triangular wave signal 41 (FIG. 1A) from an oscillator 42 is supplied via a line 43 to the non-inverting (+) input of the amplifier 40. The minimum and maximum voltages of the triangular wave 41 are selected to correspond to the range limits of the dc level present on the line 33. This is indicated by the superposition of the wave shape 41 and the dc levels 34-36 in FIG. 1A.

The amplifier 40 provides a high output on the line 39 whenever the dc level at the terminal 33 is more negative than the triangular wave 41. Thus, if the dc level is at its most negative value (waveshape 36) corresponding to a maximum input pulse width of 2 msec, the output signal on the line 39 will have substantially a 100% duty cycle, as indicated by the waveform 44 in FIG. 1A. At the other extreme, if the dc level is that indicated by the horizontal line 34 in FIG. 1A, corresponding to an input pulse width of 1 msec, the signal on the line 39 will remain low, representing a zero duty cycle. In between these two extremes, the duty cycle of the signal on the line 39 will have an intermediate range proportional to the input pulse width. This is illustrated by the waveshape 45 (FIG. 1A) that corresponds to the dc level 35 indicative of an input pulse width of 1.7 msec. As described below, the motor 11 is switched on during the on duty cycle of the signal on the line 39.

The triangular wave oscillator 42 is conventional, and includes an operational amplifier 47, a set of resistors 48 through 53 and a capacitor 54. A resistor 55 provides stabilizing feedback from the output of the amplifier 40, and thus ensures transient-free switching of the comparator 38. The frequency (typically 1 kHz) of the oscillator 42 establishes the repetition rate of the control signal on the line 39.

With the arrangement described above, the maximum duty cycle of the signal on the line 39, and hence the maximum motor speed, will result when the input information pulses are of maximum pulse width (typically 2 msec). However, certain radio control transmitters are arranged so that when the throttle control is set to the highest speed position, the information pulse width is minimum. To accommodate operation of the speed controller 10 with such transmitters, the system includes a circuit 57 that may be used to invert the duty cycle. This circuit comprises an exclusive-OR gate 58, a pair of resistors 59, 60 and a switch 61. When the switch 61 is set to the (+) position shown, no inversion of the duty cycle occurs, however, the "on" portion of the duty cycle is represented by a low output at the terminal 62. This will cause turn-on of the motor 11. If the switch 61 is set to its other position, the duty cycle is inverted. In that case, input pulses of minimum (1 msec) pulse width will result in maximum speed of the motor 11.

The control signal on the line 62 is used to gate on and off a switching regulator 65 that provides base bias to a power transistor 66 which switches current to the motor 11. The power transistor 66 is driven into saturation during the on duty cycle of the signal on the line 62. When the transistor 66 is thus fully conducting, current flows through the motor 11 from the battery 12. During the off portion of the control signal on the line 62, the transistor 66 is off. At that time, inductive transients from the motor 11 can flow through a shunt diode 67. The speed of the motor 11 is a function of the on duty time of the transistor 66, and hence is directly proportional to the pulse width of the signal supplied to the input terminals 13 and 14.

The switching regulator 65 drops the voltage from the battery 11 to a level equal to the base-to-emitter drop Vbe of the drive transistor 66. This is accomplished by intermittently switching on and off a regulator transistor 68, the emitter of which is connected to the battery 12. When the transistor 68 is on, current flows to the base of the transistor 66 via an inductor 69 and a resistor 70 of low value, typically 1 ohm. The sum of the base-to-emitter voltage Vbe and the base current Ib, developed across the resistor 70, is sampled via a resistor 71 and supplied to the inverting (−) input of an operational amplifier 72. This amplifier input also receives the control signal from the line 62 via a resistor 73 and a bypass capacitor 74. When that signal is low, the regulator 65 is enabled.

Assuming that the signal on the line 62 is low, so that the switching regulator 65 is on, when the base drive current to the transistor 66 reaches a specified value, the output of the amplifier 72 will drop toward ground. This will turn off a transistor 75 the base of which is connected directly to the amplifier 72 output and to a positive voltage via a resistor 76. As a result of turn-off of the transistor 75, the voltage at the junction of a pair of resistors 77, 78 will rise toward the voltage of the battery 12, thereby turning off the transistor 68. The choke 69 will discharge through a diode 79, thereby reducing the feedback voltage through the resistor 71. When this feedback voltage drops sufficiently, the transistor 75 will again go on, turning on the transistor 68. Once again, current flows through the inductor 69. This rapid switching operation maintains the current at the base of the transistor 66 at the desired level, so long as the switching regulator 65 itself is held on by the control signal on the line 62. The switching rate of the regulator 65 typically is on the order of 20 kHz. The switching regulation provided by the circuit 65 provides the requisite base drive current to the transistor 66 regardless of the voltage of the battery 12, and with minimum power loss.

When the transistor 66 is on, the motor 11 current flows through the collector-to-emitter path of this transistor. Thus, the collector current Ic of the transistor 66 depends on the size of the motor 11 and the voltage of the battery 12. However, the base-to-emitter voltage drop Vbe of the transistor 66 is proportional to Ic, and thus will increase if a higher voltage motor 11 is used. The switching regulator 65 automatically compensates for this.

To this end, the Vbe voltage drop of the transistor 66 is sensed and supplied back to the non-inverting (+) input of the amplifier 72 via a resistor divider comprising the resistors 78–80. This feedback voltage is compared in the amplifier 72 with the other feedback signal (supplied via the resistor 71) which is indicative of the sum (Vbe+Ib) of the transistor 66. As a result, the current supplied by the switching regulator 65 to the base of the transistor 66 will be a function of the collector current. This is advantageous, since if a larger motor 11 and battery 12 is employed, the regulator 65 will automatically compensate for this change by supplying more base current to the drive resistor 66.

The battery voltage supplied to the regulator 65 is filtered by a capacitor 81. The positive voltage used to drive the other controller 10 circuits is filtered by a capacitor 82.

In the alternative embodiment of FIG. 2, the circuit 100 controls both the speed and the direction of rotation of the motor 11' in response to the pulse width of a signal applied to the input terminals 13' and 14'. In this embodiment, components having primed designating numerals correspond to like numbered but unprimed elements in the embodiment of FIG. 1.

The input signal again typically is obtained from the decoder output of a radio control receiver. For the control of boats and automobiles, the central position of the transmitter throttle control is an "off" or "neutral" position. The transmitted data pulses corresponding to this neutral position typically have a pulse width of 1.5 msec. When such a signal is received, the circuit 100 provides on a line 101 a control signal 102 (FIG. 2A) of zero duty cycle. No power is then provided to the motor 11' and it remains stopped.

When the throttle control at the transmitter is moved to a "forward" position, the radio control information pulses increase in width in proportion to the desired forward speed. As a result, the circuit 100 produces on the line 101 a control signal 103 (FIG. 2A) having a lower voltage level than the signal 102 and having a duty cycle proportional to the width of the radio control pulses. Power is switched to the motor 11' during this duty cycle with a polarity that results in forward motor rotation, at a speed proportional to the on duty cycle. Conversely, when the throttle control is moved to a "reverse" position, the radio control pulse width decreases below 1.5 msec in proportion to the desired speed. The circuit 100 then produces at the line 101 a signal 104 (FIG. 2A) that is positive-going with respect to the neutral signal 102, and having an on duty cycle proportional to the received pulse width. This control signal causes power from the battery 12' to be applied with opposite polarity to the motor 11' so that the motor rotates in a reverse direction at a speed proportional to the on duty cycle of the signal 104.

In the embodiment shown, the circuit 100 does not employ a pulse interface circuit such as that designated 16 in FIG. 1. Such a circuit could, however, be used with this embodiment. The input radio control signal is amplified by an amplifier 106 consisting of a transistor 107 and a set of resistors 108 through 110. The amplified signal is converted by a circuit 27' to a dc level at a terminal 33' that is proportional to the pulse width of the incoming signal. Again, owing to the long time constant of the RC integrator consisting of the capacitor 31' and the resistors 32' and 111, the dc level at the terminal 33' is frame rate insensitive.

A comparator 113 having a pair of operational amplifiers 114, 115 is used to produce the three-level signal 102, 103, 104 (FIG. 2A) in response to the dc level supplied at the terminal 33'. To this end, an oscillator 42' provides a triangular wave via a line 116 to the inverting (−) input of the amplifier 115 and via a capacitor 117 and a line 118 to the inverting (−) input of the amplifier 114. The triangular waves 116a, 118a (FIG. 2B) supplied respectively to the amplifiers 114, 115 are of identical shape and "height". However, they are offset in voltage from one another by an amount determined by the dc bias supplied on the line 118 by a divider comprising a pair of resistors 119 and 120. These are selected so that there is a voltage separation or "dead band" 121 (FIG. 2A) between the triangle waves 116a and 118a. The dc level on the line 33' lies within the dead band 121 when the incoming pulse width is at a nominal 1.5 msec corresponding to the throttle control neutral position. The width of the dead band 121 provides for a slight range for the nominal pulse width corresponding to the neutral position, since there will be some variation in this pulse width value for different radio control transmitters.

When the incoming pulse train is at the nominal 1.5 msec pulse width, the dc level at the terminal 33' is within the dead band 121, as indicated by the horizontal line 122 in FIG. 2A. In this condition, the amplifier 114 provides a low output current sink and the amplifier 115 provides an open output. That is, current flows through the resistors 126 and 127, but not through the resistor 128. The values of these resistors are selected so that under this "neutral" condition, the voltage at the line 101 is one-half of the voltage (typically +4.8 volts) supplied at a terminal 129. The line 101 is connected to the bases of a pair of transistors 131a, 131b the emitters of which are biased at one-half of the voltage at the terminal 129 by means of the resistors 132 and 133. Therefore in the "neutral" condition, both of the transistors 131a and 131b are off.

With an incoming radio control signal of longer pulse width, indicative of the forward direction, the dc level at the terminal 33' is indicated by horizontal line 123 in FIG. 2A. This level "intersects" the triangular wave 116a so that the amplifier 115 will be turned on and off with a duty cycle proportional to the dc level at the terminal 33'. When the amplifier 115 goes low and sinks current, the voltage at the line 101 falls toward ground. This results in an output signal having the waveshape 103 shown in FIG. 2A.

Conversely, when the input signal is of shorter pulse width, indicative of the reverse direction, the dc level at the terminal 33' is of higher value, as indicated by the line 124 in FIG. 2A. Under this condition, the amplifier 115 is intermittently turned on and off. When it is off, it sinks no current and the voltage at the line 101 is raised toward the supply level of +4.8 volts. This produces the signal 104 of FIG. 2A. A capacitor 129 prevents oscillation of the comparator 113.

The three-level signal 102, 103, 104 controls a bridge drive circuit 130 that supplies current to the motor 11' with the appropriate polarity for forward or reverse rotation.

When forward rotation is indicated by the presence of the signal 103, a transistor 131a is turned on when the voltage on the line 101 falls toward ground. The emitter of this transistor 131a is held at about half the supply voltage by a divider comprising a pair of resistors 132 and 133. When the transistor 131a goes on, it also turns on a pair of transistors 134 and 135 so that current flows through an associated pair of resistors 136 and 137a. This provides base drive to a transistor 138a. The resistor 137a and another resistor 139a together form a voltage divider across the nominal voltage source of 4.8 volts. Since this voltage is fixed, irrespective of the voltage of the motor battery 12', and since the values of the resistors 137a and 139a are fixed, the voltage at the base of the transistor 138a is fixed.

When the transistor 138a goes on, current is conducted from the battery 12' via the emitter-to-base path of the transistor 143a, the transistor 138a, a resistor 141a and the base-to-emitter path of a transistor 146a to ground. Advantageously, the resistor 141a is of small value, typically 1 ohm. This circuit, including the transistor 138a and the resistor 141a, operates as a constant current source of base drive for the pair of power switching transistors 143a and 146a that form two legs of a bridge circuit driving the motor 11'. As a result of the constant current circuit, the transistors 143a and 146a receive a constant base current independent of the motor battery 12' voltage.

Current flow to the motor is from the battery 12', through the transistor 143a, through the motor 11' from a first terminal 144 to a second terminal 145, and through the transistor 146a to ground. This polarity results in forward rotation of the motor 11'. Since the transistors 143a and 146a are switched on digitally, during the on duty cycle of the signal 103 (FIG. 2A), the speed of the motor 11' will be determined by the pulse width of the incoming radio control signal, when that pulse width is greater than the nominal value at the "neutral" throttle position.

For reverse rotation of the motor 11', the higher voltage signal 104 on the line 101 turns on a transistor 131b. This turns on a transistor 150, allowing current to flow through a voltage divider consisting of a pair of resistors 137b and 139b. This provides a fixed base voltage to a transistor 138b which is connected in a constant current circuit including the resistor 141b. Constant current base drive is provided fully to turn on a pair of transistors 143b and 146b. These provide voltage to the motor 11' with the opposite polarity, so that the motor runs in reverse. A set of diodes 147a, 147b, 148a, 148b provide transient protection for the respective switching transistors 143a, 143b, 146a, 146b upon duty cycle switching of the motor 11'. A capacitor 153 filters the battery 12' voltage, and another capacitor 154 filters the voltage supply to the terminal 155.

Referring to FIG. 3, an alternate bridge drive circuit is shown. The circuit can replace the bridge drive circuit 130 of FIG. 2. This circuit facilitates both forward and reverse motor operation and ensures collector-emitter saturation of the motor controlling transistors without requiring a constant base drive current. Although it is desirable to use a bridge configuration in order to permit both forward and reverse control, the operating principle of the circuit is not limited to a bridge and therefore will be described with reference to FIG. 4, which shows only one "side" of the bridge. The other side of the bridge is identical except for the addition of an inverter 198, which provides an input signal of the correct polarity. Corresponding elements of the other side of the bridge are designated by primed numerals in FIG. 3. The motor and battery correspond to those in FIGS. 1 and 2, and are designated by 11" and 12", respectively.

The motor 11" is driven by two power transistors 200 and 202. In order to achieve most efficient operation, it is necessary to ensure collector-emitter saturation of the transistors 200 and 202. This saturation must be maintained even though different batteries and motors may be used and in spite of temperature variations.

Input pulses from a comparator (such as the comparator 113 of FIG. 2) are received along an input line 204 and supply base current to a transistor 206, and, through a Darlington connection, to a driver transistor 208. The driver transistor 208 provides the necessary base current to the transistors 200 and 202 which control the motor 11". By controlling the driver transistor 208, the base current to the power transistors 200 and 202 may be regulated to achieve collector-emitter saturation. A sample of the base current supplied to the transistor 200 is developed across a resistor 210. The emitter of a current sensing transistor 212 is connected to one side of the resistor 210. The base of the sensing transistor 212 is connected to the other side of the resistor 210 through a resistor 214 and the base-emitter junction of the transistor 208. The transistor 212 therefore monitors the current through the resistor 210. Since the transistor 212 looks at the sample resistor 210 through the base-emitter junction of another transistor (208), Vbe variations of the transistors 212 and 208 are effectively cancelled out. In addition, the entire circuit is thermally coupled, which serves to cancel out any Vbe variations due to temperature.

The resistor 214 and a pair of resistors 216 and 218 comprise a voltage divider which serves to establish the conductivity of the transistor 212 depending upon the current through the resistor 210. The transistor 212 operates as a comparator, with its own internal reference voltage being defined by the potential which is required to turn it on. When the amount of current flowing through the sample resistor 210 to the base of the power transistor 200 is sufficient to turn on the transistor 200, the sensing transistor 212 will turn on and shunt current away from the base of the transistor 206. This constitutes negative feedback, and the voltage divider is designed so that the amount of current which is not shunted away from the transistor 206 permits generation of the minimum amount of base current into the power transistor 200 which is required for the minimum amount of collector current for the transistor 200 (i.e., motor current) which will be encountered.

Since the Vbe of a transistor increases as its collector current increases, the required collector current (i.e., motor current) of the transistor 200 may be sensed by monitoring the Vbe of the transistor 200. This is accomplished by means of a sensing transistor 220. When small amounts of collector current are required for the power transistor 200, the Vbe's of the transistors 200 and 220 are virtually the same and little base current is drawn by the transistor 220, since base current through it is limited by the resistor 218. However, when the collector current of the transistor 220 increases, its Vbe increases, thus creating a differential in the Vbe potential between the transistor 200 and the transistor 220. This potential differential is forced across the resistor 218 with a consequent flow of base current through the transistor 220, which increases the conductivity of the transistor 220. The conduction of the transistor 220 effectively alters the value of the voltage divider set up by the resistors 214, 216 and 218 such that less base current flows into the current sensing transistor 212. This causes the transistor 212 to conduct less and therefore shunt less of the input current away from the transistor 206. This in turn increases the base drive current supplied to the transistor 200. A new equilibrium is established based upon the higher collector current of the transistor 200 demanded by the motor 11". The transistors 200 and 220 are thermally connected, and their Vbe's will experience similar changes, thereby cancelling out any thermal effects.

A pair of resistors 222 and 224 are utilized to shunt Icbo leakage currents for the transistors 208 and 200, respectively, thereby precluding the possibility of thermal runaway or other associated Icbo problems. A resistor 226 provides the same function for the transistor 202. A pair of diodes 228 and 230 protect the output transistors 200 and 202 from reverse potential transients generated as a result of inductive kickback from the windings of the motor 11'.

Although the circuit described includes two transistors 200 and 202 connected to the motor 11", the transistor 202 (and its associated resistor 226 and diode 230) could be eliminated, with the motor 11" and the transistor 208 being connected directly to the battery 12".

Although the circuit of FIG. 4 is shown with a Darlington connection to transfer input control pulses to the output output transistor 200, the invention is not so limited. The Darlington configuration, which may be termed a driver, could be replaced by many other arrangements, including a switching regulator. The means by which the base drive current is supplied to the transistor 200, whether it be by a Darlington configuration or other means, is not critical.

Generally, the circuit of FIG. 4 is directed to providing a means for controlling the generation of the base drive current to an output transistor so as to ensure collector-emitter saturation of the transistor despite the fact that differing loads may be used (e.g., different size motors), different batteries may be used and temperatures may vary. This control is accomplished by monitoring the base drive current which is supplied to the output transistor and by monitoring the collector current which is required by the output transistor. The collector current is monitored indirectly by monitoring the Vbe of the output transistor. A portion of the input to the driver is shunted away in response to the monitored values so that only the minimum amount of base current needed to saturate the output transistor is generated. A first sensing transistor which is used to sense the base current is controlled by a voltage divider network and is turned on to an extent sufficient to shunt away a portion of the input to the driver so that the base drive current generated will be sufficient for the minimum collector current requirements of the output transistor. As the collector current requirements of the output transistor increase, a transistor which is used to monitor the Vbe of the output transistor is turned on in order to vary the value of the voltage divider network which controls the first sensing transistor. The change in the voltage divider network will decrease the conductance of the first sensing transistor which in turn decrease the amount of current which is shunted away from the driver. The voltage divider network is varied by the second sensing transistor until the base current generated by the driver is sufficient for the output transistor collector current requirements. Thus, negative feedback is utilized to ensure that the base current generated by the driver is always just enough to ensure collector-emitter saturation of the output transistors. This results in much more efficient operation than would be the case if the driver would be required to generate the maximum amount of base current which would ever be needed by the output transistor.

Although the circuits of FIGS. 3 and 4 have been described in terms of use in a circuit for controlling the duty cycle of a motor in which a digital control signal is applied to the transistor 206, the circuit could also be used to ensure power transistor collector-emitter saturation when a continuously running motor is used, i.e., when there is a constant dc control signal applied to the transistor 206.

Throughout this description, reference to an operational amplifier refers to a comparator such as that available commercially as a type LM 339N integrated circuit.

Although the foregoing description shows use of the inventive motor speed controller in a radio controlled model, its use is not so limited. The invention may be employed, to control dc motors in other applications, for example in a motorized wheel chair, bicycle or other device.

I claim:

1. An electronic circuit for supplying voltage from a source to a load, comprising:
    a power transistor device connected in series with said source and said load;
    driver means for supplying a base drive current to said power transistor, said driver means having a control input which receives an input signal; and
    control circuitry, connected to the power transistor device and to the driver means, for sensing the base-to-emitter voltage of the power transistor and varying the value of the input signal applied to the control input as a function of the sensed base-to-emitter voltage so as to establish a base drive current that is near the minimum required to maintain collector-emitter saturation of said power transistor device.

2. An electronic circuit for supplying voltage from a source to a load, comprising:
- a power transistor device connected in series with said source and said load;
- driver means having a control input, for supplying a base drive current to said power transistor device;
- control circuitry, connected to the driver means and power transistor device, for sensing the base-to-emitter voltage of the power transistor device and increasing the supplied base drive current in response to an increase in the sensed voltage so that the base drive current is near the minimum required to maintain collector-emitter saturation of said power transistor device.

3. The circuit of claims 1 or 2 wherein said control circuitry operates in response to sensed values of the actual base drive current of the power transistor device and the base-to-emitter voltage of the power transistor device.

4. The circuit of claims 1 or 2 wherein said control circuitry includes:
- a first sensing transistor connected between the control input of the driver means and the base of said power transistor device, said first sensing transistor monitoring the base drive current of said power transistor device;
- a voltage divider connected to provide base voltage to said first sensing transistor as a function of said monitored base drive current;
- means for altering the effective value of said voltage divider in response to a sensed value of the base-to-emitter voltage of said power transistor device.

5. The circuit of claim 4 wherein said means for altering comprises a second transistor connected to said voltage divider, the conductivity of said second transistor determining the effective value of said voltage divider and being varied as a function of the base-to-emitter voltage of the power transistor device.

6. The circuit of claims 1 or 2 wherein said driver means comprises two transistors in a Darlington configuration.

7. The circuit of claim 2 wherein said load is a dc motor and further including:
- means for developing a dc signal proportional to the desired speed of said dc motor; and
- means for producing a digital signal having a duty cycle proportional to said dc signal level, the output of said means for producing a digital signal being connected to the control input of said driver means.

8. The circuit of claim 1, 2 or 7 wherein said power transistor device comprises a bridge circuit having four power transistors connected in a bridge arrangement, said source being connected to the input of said bridge and said motor being connected to the output of said bridge, one pair of said power transistors being turned on to deliver power to said load with one polarity and the other pair of said power transistors being turned on to deliver power to said load with the opposite polarity.

9. The circuit of claim 1 wherein the control circuitry includes:
- first sensing means for monitoring the base drive current supplied to said power transistor device and for varying the value of the input signal to the driver means as a function of the monitored base drive current; and
- second sensing means for monitoring the collector current required by the power transistor device and for modifying, as a function of the sensed collector current requirement, the degree of input signal variation provided by said first sensing means.

10. The circuit of claim 9 wherein said second sensing means monitors the required collector current indirectly by sensing the base-to-emitter voltage of the power transistor device.

11. The circuit of claim 9 wherein said first sensing means includes a current sensing transistor connected between the input and output of the driver means, wherein when the first sensing transistor senses that excessive base drive current is being supplied to the power transistor device, the first sensing transistor is rendered more conductive, thereby reducing the value of the command signal.

12. The circuit of claim 11 wherein said second sensing means includes a second sensing transistor that monitors the collector current requirement of the power transistor device by sensing the base-to-emitter voltage of the power transistor device, wherein said second sensing transistor is connected to the first sensing transistor and the degree of conduction of said first sensing transistor for a particular value of said supplied base drive current is a function of the degree of conduction of the second sensing transistor.

13. An electronic circuit for supplying voltage from a source to a load, comprising:
- a power transistor device connected in series with said source and said load;
- means for supplying base drive current to the power transistor;
- control circuitry for monitoring the value of the base-to-emitter voltage of the power transistor device and increasing the amount of base drive current supplied to the power transistor as the base-to-emitter voltage increases so as to establish a base drive current that is near the minimum required to maintain collector-emitter saturation of the power transistor device.

* * * * *